United States Patent
Gommel et al.

[11] Patent Number: 6,082,549
[45] Date of Patent: Jul. 4, 2000

[54] PROCESS AND FACILITY TO REMOVE SOLID MATTER FROM AN AQUEOUS FIBROUS MATERIAL SUSPENSION

[75] Inventors: Axel Gommel; Martin Kemper, both of Ravensburg, Germany

[73] Assignee: Voith Sulzer Papiertechnik Patent GmbH, Ravensburg, Germany

[21] Appl. No.: 09/116,236

[22] Filed: Jul. 16, 1998

[30] Foreign Application Priority Data

Jul. 31, 1997 [DE] Germany ............... 197 33 059

[51] Int. Cl.[7] ............... D21C 5/02; B03D 1/02; B03D 1/14; B03D 1/24
[52] U.S. Cl. ............... 209/164; 209/170; 210/221.2; 162/4
[58] Field of Search ............... 209/164, 170; 162/4; 210/221.2

[56] References Cited

U.S. PATENT DOCUMENTS

| | | |
|---|---|---|
| 1,557,369 | 10/1925 | Kleinbentink . |
| 1,952,727 | 3/1934 | Ralston . |
| 2,274,401 | 2/1942 | Dromgold . |
| 3,828,935 | 8/1974 | Rovel . |
| 4,390,430 | 6/1983 | Van Leeuwen . |
| 4,431,531 | 2/1984 | Hollingsworth . |
| 4,624,791 | 11/1986 | Ferriss . |
| 4,851,036 | 7/1989 | Anthes . |
| 5,234,112 | 8/1993 | Valenzuela et al. . |
| 5,335,785 | 8/1994 | Kawatra et al. . |
| 5,580,446 | 12/1996 | Markham . |

FOREIGN PATENT DOCUMENTS

| | | |
|---|---|---|
| 735237 | 8/1955 | United Kingdom . |
| 2036603 | 7/1980 | United Kingdom . |
| 2106806 | 4/1983 | United Kingdom . |
| 94/17920 | 8/1994 | WIPO . |
| 95/21698 | 8/1995 | WIPO . |

*Primary Examiner*—Thomas M. Lithgow
*Attorney, Agent, or Firm*—Greenblum & Bernstein, P.L.C.

[57] ABSTRACT

A process and apparatus serves to remove solid matter from an aqueous material suspension produced from printed used paper. As many interfering material particles are collected by floatation as possible in a floatation foam and diverted as a reject. A perforated separating element is located above the fibrous material suspension. Between the separating element and the floatation foam, an intermediate layer is formed. In the intermediate layer the fibers, which have been entrained by gas bubbles are again rinsed and retrieved.

20 Claims, 4 Drawing Sheets

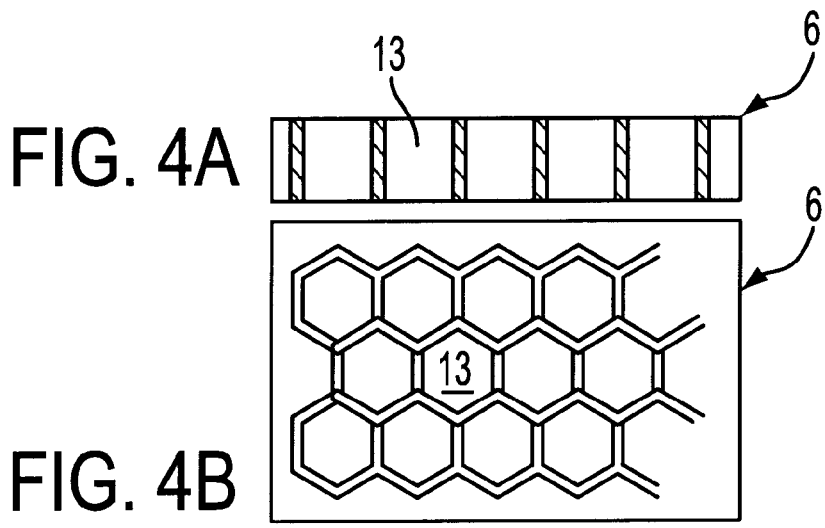
FIG. 4A
FIG. 4B
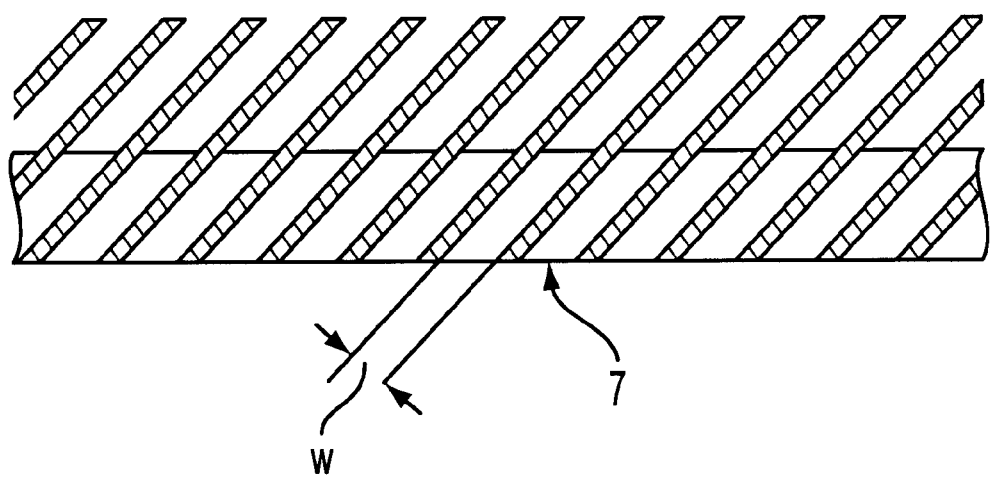
FIG. 6

PROCESS AND FACILITY TO REMOVE SOLID MATTER FROM AN AQUEOUS FIBROUS MATERIAL SUSPENSION

CROSS-REFERENCE TO RELATED APPLICATION

The present invention claims priority under 35 U.S.C. 119 of German Patent Application No. 197 33 059.2 filed on Jul. 31, 1997, the disclosure of which is expressly incorporated by reference herein, in its entirety.

BACKGROUND OF THE INVENTION

1. Field of the Invention

The invention relates to a process and a facility to remove solid matter from an aqueous fibrous material suspension.

2. Discussion of Background Information

Processes of the above-discussed type are used to eliminate at least a portion of the undesired solid matter particles suspended in a fibrous material suspension containing fibrous material. It is known that a foam or scum containing the materials to be eliminated is formed in a floatation process. A common use of such a process is the preparation of an aqueous fibrous material suspension gleaned from printed recycled paper, in which the printing ink particles are already separated from fibers, so that they can be floated out. The flotation process described here utilizes the differences between fibrous material and undesired solid matter particles in such a way that the fibrous material remains in the fibrous material suspension due to its hydrophilicity, while the already-mentioned solid matter particles are hydrophobic and thus mix the foam with the air bubbles. Aside from printing ink particles, there are other materials which are hydrophobic and thus can be separated by flotation from the fibrous material. In particular, such materials are adhesives, fine synthetic material particles, and perhaps also resins. When fibers are separated from contaminations through the flotation process, not all solid matter particles are to be sorted out. Thus, selective flotation processes are performed. The term "flotation de-inking," likewise utilized, is generally not only used for the removal of printing ink particles but rather more generally for the selective flotation of contaminations from fibrous material suspensions.

The prior art with respect to flotation procedures for fibrous material suspensions has advanced quite far. Therefore, solutions exist which are certainly suited for removing a large portion of the interfering material particles by flotation. It is disadvantageous, however, that in many cases the separation distinction is insufficient; that is, too many fibers reach the foam with the contaminations. They then are either lost or must be retrieved through great effort.

The invention therefore has the fundamental task to create a flotation process with which losses of desired components, especially the fibers, are low with a simultaneously good removal effect of the undesired particles.

SUMMARY OF THE INVENTION

With the aid of the separating element used in accordance with the invention, the aqueous intermediate layer of the fibrous material suspension, which is for example formed above the separating element, is separated. The gas bubbles rise through the intermediate layer until they reach the flotation foam. As the intermediate level contains a relatively low level of fibers, hydrophilous particles which might still be clinging are easily rinsed or washed away, while the hydrophobious particles, i.e., the solid matter to be removed, can maintain a stable bond with the gas bubbles. The danger of the undesired transportation with or addition of fibers to the gas bubbles is lower there than in the fibrous material suspension, merely because of the low fiber amount. A retrieval of the desired fiber components thus takes place in the intermediate layer. In order to avoid an increase in concentration/agglomeration of the retrieved fibers in the intermediate layer, a portion of that generally must be continually diverted, or diverted in rotation, as excess. This surplus can, for example, be redirected to the suspension before entry into the floatation device. However, it can flow back through the separating element in an internal circulation at places determined for that or as diluting water in the preparation process for recycled paper.

The separation element results in an equalizing of the flow; large whorls and cross-streams, which have worked in favor of the addition of particles to be eliminated in the flotation chamber underneath, cannot penetrate into the intermediate layer. Perhaps locally limited whorls remain, and that benefits the rinsing of the fibers. This intermediate layer is thus low in fibers and exhibits a relatively calm, homogenous flow: optimal conditions for rinsing hydrophilous fibers.

Thus, an aspect of the invention is to provide a process for removing solid matter from an aqueous fibrous material suspension containing paper fibers. The process comprises guiding the solid matter from the fibrous material suspension using gas bubbles, collecting the solid matter in a flotation foam, removing the solid matter as a reject and, forming a cleaned fibrous material suspension. The gas bubbles are guided through a perforated separating element from the fibrous material suspension and through an aqueous intermediate layer prior to the gas bubbles reaching the flotation foam. The aqueous intermediate layer has a fibrous material content which is at most approximately 50% of the paper fiber content of the fibrous material suspension.

Another aspect of the invention provides for the fibrous material content in the intermediate layer to be at most approximately 20% of that in the fibrous material suspension.

A further aspect of the invention is to provide a process wherein the gas bubbles are substantially air bubbles.

Yet another aspect of the invention is to provide a process wherein the intermediate layer extends in an ascending direction of the gas bubbles at a height of between approximately 50 mm and approximately 1,000 mm.

Another aspect of the invention is to provide a process which further comprises supplying the aqueous intermediate layer as a cleaning fluid comprising water and, maintaining the aqueous intermediate layer by diverting any surplus of the cleaning fluid.

Another aspect of the invention is to provide a process wherein the cleaning fluid flows essentially transverse to an ascending direction of the gas bubbles.

A further aspect of the invention is to provide a process wherein the aqueous intermediate layer is at least partially supplied by a mixture of gas bubbles and fluid which pass through the separating element.

Another aspect of the invention is to provide a process wherein openings are provided in the separating element and have a width of between approximately 2 mm and approximately 20 mm.

A further aspect of the invention is to provide a process wherein the width of the openings is variable and adjustable.

Another aspect of the invention is to provide a process wherein the cleaning fluid contains a chemical to facilitate separation of the fibers from the gas bubbles and in which the chemical contains a tenside/surface-active agent.

A further aspect of the invention is to provide a process wherein the flow of the mixture of gas bubbles and fluid is first advanced through the separating element and then retarded.

A further aspect of the invention is to provide a process wherein flow of the mixture of gas bubbles and fluid is diverted through the separating element from a substantially vertical direction of ascent of the gas bubbles.

Another aspect of the invention is to provide a process wherein fluid transport through the separating element is approximately 5% maximum of the throughput of the aqueous fibrous material suspension.

An additional aspect of the invention is to provide a process in which the fibrous material suspension is turbulent and a portion of the turbulence in the fibrous material suspension is eliminated by passing through the separating element.

Another aspect of the invention is to provide a flow path for the mixture of gas bubbles and fluid through the separating element which is at least approximately 10 mm in length.

Another aspect of the invention is the provision of at least one separating element being located above the aqueous intermediate layer and in which the flotation foam is collected in a region over the uppermost intermediate layer.

Yet another aspect of the invention is to provide a process wherein the fibrous material suspension to be cleaned is guided in succession through at least two flotation devices. At least part of the solid matter is removed at each of the two flotation devices with the assistance of gas bubbles. Formation of at least one aqueous intermediate layer occurs due to at least one separating element in one part of the flotation process.

Another aspect of the invention is a process wherein at least part of the separating element is displaceable.

In another aspect of the invention, a flotation apparatus is provided for a fibrous - material suspension which includes a flotation chamber, an inlet pipe for introducing the fibrous material suspension into the flotation chamber, a discharge pipe for removing the fibrous material suspension from the flotation process after cleaning and a collection chamber positioned above the flotation chamber to collect foam produced during the flotation process. The flotation chamber and the collection chamber are separated by a separating element provided with openings and a discharge line is located above the separating element. The discharge line diverts a surplus of the fibrous material suspension and is provided with an inflow section which is below an area in which the flotation foam is collected.

A further aspect of the invention is to provide an apparatus which includes a supply device for supplying cleaning fluid and an escape opening located at substantially the same height as the inflow opening of the discharge line.

Another aspect of the flotation apparatus is to provide a perforated separating plate which may be a honeycomb structure.

Another aspect of the flotation apparatus is to provide the separating plate as a bubble plate.

A further aspect of the apparatus includes providing the separating plate as two plate elements, at least one of which can move relative to the other.

BRIEF DESCRIPTION OF THE DRAWINGS

The present invention is further described in the detailed description which follows, in reference to the noted drawings by way of non-limiting examples of preferred embodiments of the present invention, wherein the same reference numerals represent similar parts throughout the several views of the drawings, and wherein:

FIG. 4a is a side view of a variation of the separating plate shown in FIG. 2;

FIG. 4b is a top view of the separating plate of FIG. 4a;

FIG. 6 is a side view of another variation of the separating plate shown in FIG. 2;

DETAILED DESCRIPTION OF THE INVENTION

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
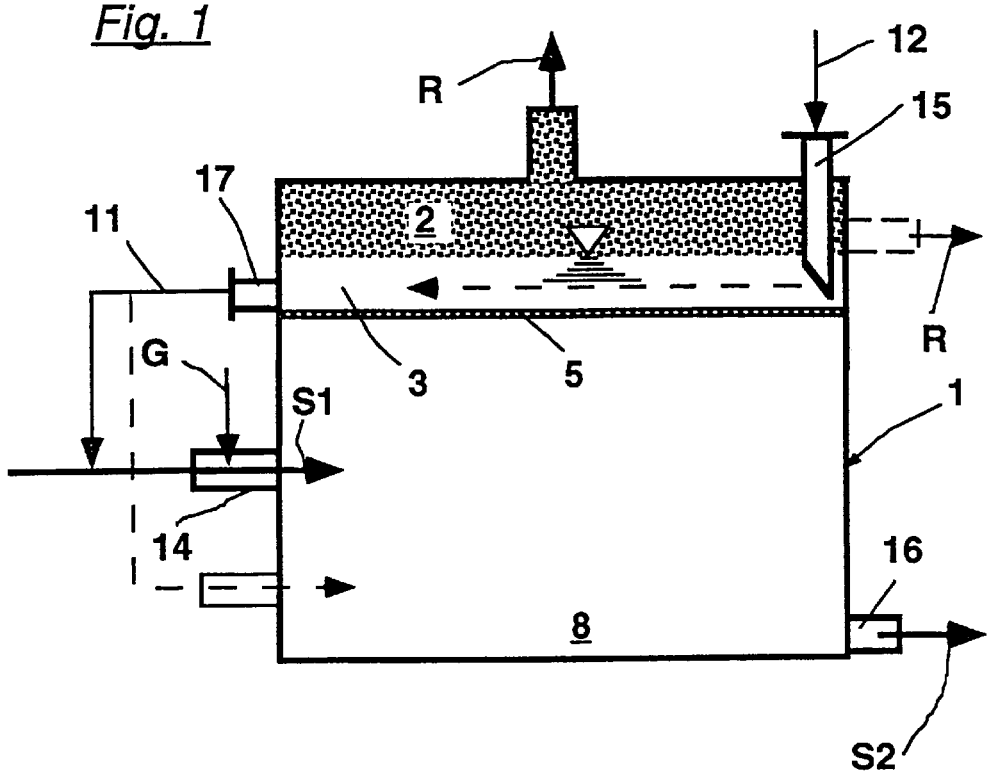
FIG. 1 is a flotation device for performing the process in accordance with the invention.

FIG. 1 is a schematic representation of a flotation device 1 to execute the process in accordance with an aspect of the invention. The suspension S1 enters the floatation chamber 8 of the flotation device 1 through an inflow pipe 14. In the case shown here, it is mixed in the inflow pipe 14 with a gas G such that gas bubbles which are necessary for flotation are provided. These gas bubbles rise upward in the flotation chamber 8, transporting attached solid matter particles therewith, and reach the separation element 5. The gas bubbles flow through the elements 5 without losing the solid matter particles bonded thereto. On the other hand, openings in the separating element are designed such that only a small portion of the suspension fluid is entrained. Thus, a separation occurs at the separating element 5 between the fibrous material suspension S1 with relatively high dry content, e.g., around 1% by weight, and the intermediate layer 3, which is located above the separating element 5 and which exhibits a relatively low level of fibers. The intermediate layer extends in an ascending direction of the gas bubbles at a height of between approximately 50 mm and approximately 1000 mm. The aqueous intermediate layer 3 has a fibrous material content which is at most approximately 50% by weight of the paper fiber content of the fibrous material suspension and can be at most 20% by weight of that in the fibrous material suspension. As already explained, a considerable portion of the hydrophilous components still bonded to the air bubbles, especially the fibers, can separate from the gas bubbles in the intermediate layer 3 and can be diverted with the surplus 11 through the discharge line 17 out of the flotation device 1.

This surplus 11, which thus contains a part of the retrieved fibers but which also may still contain undesired solid matter particles (here indicated by the solid arrow), can be supplied to the inflow pipe 14 and then mixed with the suspension S1. It can, however, also be introduced directly into the flotation chamber 8, as noted here by an arrow with a dashed-line. Since the air content of the surplus 11 is significantly lower than that of the fibrous material suspension S1, this reflux process occurs in a self-regulating manner. The floatation foam 2 is located above the intermediate layer 3. It can either be suctioned off from above or can run off on the side, whereby the side drain is illustrated by a dashed line. In order to supply the intermediate layer 3, a supply device for a cleaning fluid 12 is shown. Through the design of the floatation device, a counterflow can be produced in the intermediate layer. The counter flow is selected as a counterflow to the main flow of the suspension in the flotation device, the main flow running from the inflow pipe 14 to the escape pipe 16.

Figure 2:
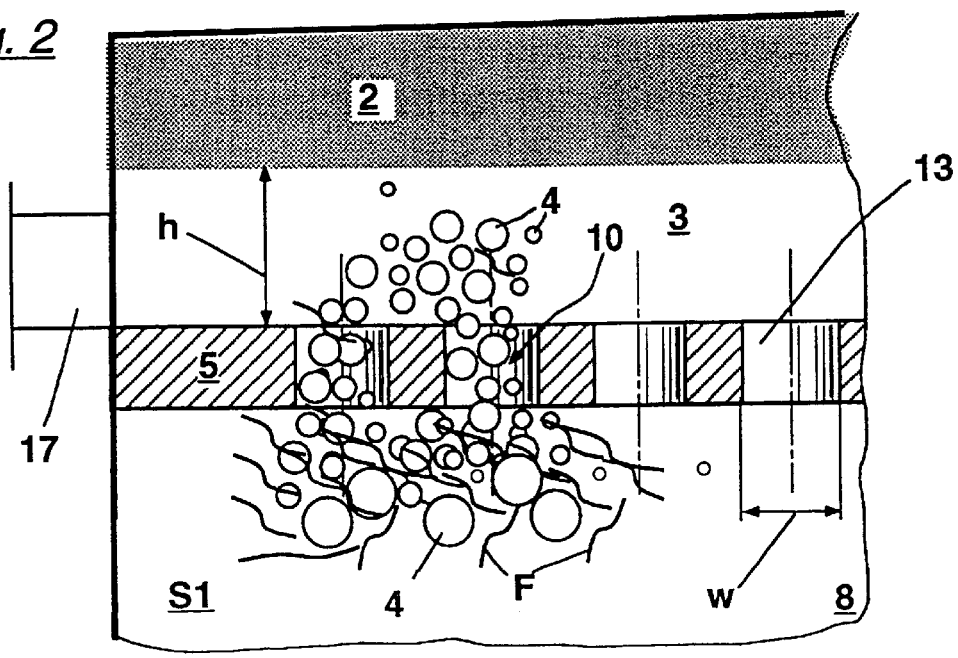
FIG. 2 is a detailed view of FIG. 1.
Figure 3:
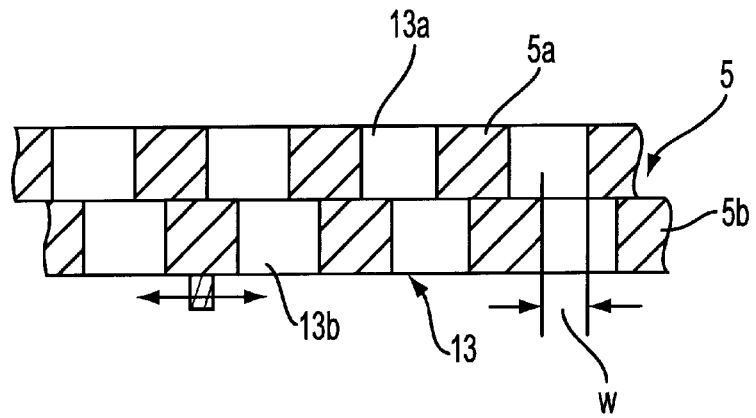
FIG. 3 is a variation of the separating plate shown in FIG. 2.

In FIG. 2, the flotation process about the separating element 5 is illustrated in somewhat more detail, not necessarily according to scale. Therein, an example of some air bubbles 4 as well as some fibers F is shown. The hydrophobious particles to be eliminated are not depicted. A mixture 10 of gas bubbles and fluid flows through the openings 13 of the separating element 5. The flow path of the mixture of gas bubbles and fluid through the separating element 5 is at least approximately 10 mm in length. The separating element 5 contains a large number of openings 13 of which only four are shown. The openings 13 have a width w, which is equal to the diameter of the cylindrical holes defining the openings. The openings 13 have a width w of between approximately 2 mm and approximately 20 mm. Nevertheless, if slits or similar openings are selected, the width corresponds to the slit width. It is also possible to make the openings variable and adjustable. Such an arrangement can be provided by adjacent perforated plates which can slide one against each other, as shown in FIG. 3. In FIG. 3, the separating element 5 is in the form of two plates 5a, 5b provided with openings 13a, 13b. The plates are in sliding contact with each other The openings 13a, 13b have a width w as discussed previously. In the aspect shown in FIG. 3, The plate 5b is movable in the directions shown by the two-headed arrow. The movement of the plate 5b is produced by any suitable mechanism. In the aspect shown, the plate 5b is moveable; however, the plate 5a could be movable with respect to plate 5b. In the alternative, both plates could be movable. By movement of one or both plates 5a, 5b, the effective width w of the openings can be varied. In this aspect of the invention, the width w of FIG. 3 can be less than the width w of FIG. 2.

The openings 13 do not necessarily have to be round. The openings can, as shown in FIG. 4b, have a honeycomb pattern. The separating element 6 having openings of this form is illustrated in FIG. 4a in a side sectional view and in accordance with FIG. 4b, in a top view.

Figure 5:
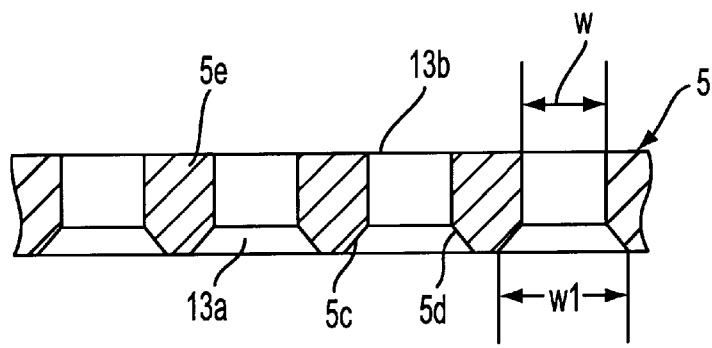
FIG. 5 is a sectional view of another variation of the separating plate of FIG. 2.

FIG. 5 shows an example in which the openings 13 are not equal in the separating element 5, but rather, become narrower in the flow direction, for example. In this aspect of the invention, the width w, at the entrance of the plate 5 is wider than the discharge opening 13b. The plate has partitions 5e between the openings 13a, 13b. The partitions 5e are provided with a sloping side face 5c which, in the direction of the inlet 13a, has a width w1. The sloping side face 5c tapers inwardly to a shoulder 5d that corresponds to the width w at the outlet opening 13b. The reversal, that is, an increase in the width in the flow direction, can also be practical.

The separating element 7 in accordance with FIG. 6 is provided by a large number of canted plates, which allow an especially good separation of the intermediate layer from the fibrous material suspension. The width w is illustrated here, too. The flow direction of the gas bubbles during their ascent through the flotation is diverted when the bubbles pass through the slits. This diversion in the flow direction can benefit the washing of the fibers which may still possibly be bonded to the gas bubbles. With respect to the flow relationships, locally limited flow whorls are produced, the force of which suffices to separate the hydrophilous fibers; however, the whorls are nevertheless too weak to effect the same in the hydrophobious solid matter particles.

Figure 7:
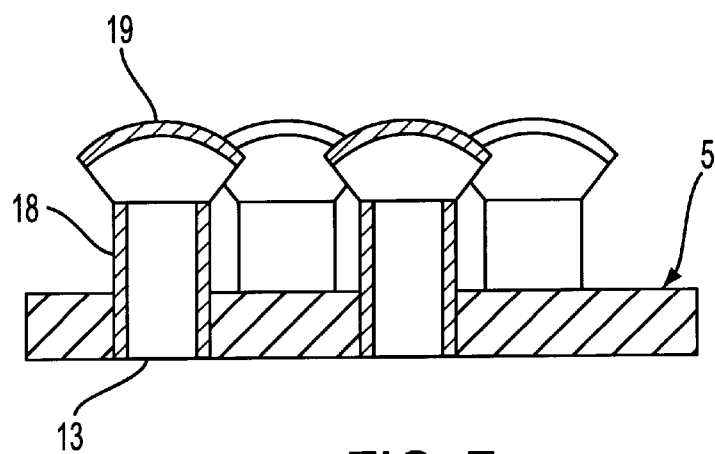
FIG. 7 is a side view of another variation of the separating plate shown in FIG. 2.

A further possibility to attain the relationships in the intermediate layer 3 just described, that is, the rinsing of the fibers but not of the contamination particles, can, in certain cases, be benefited by a bubble plate, as is shown by way of example in FIG. 7. In the example shown, the openings 13 are elongated in the separating element 5 by installed pipe pieces 18, which are each equipped with a covering bubble 19, in order to reverse the ascending movement of the gas bubbles and to produce targeted local turbulences. Bubble plates of different types are known, e.g., in apparatuses in the chemical industry.

Figure 8:
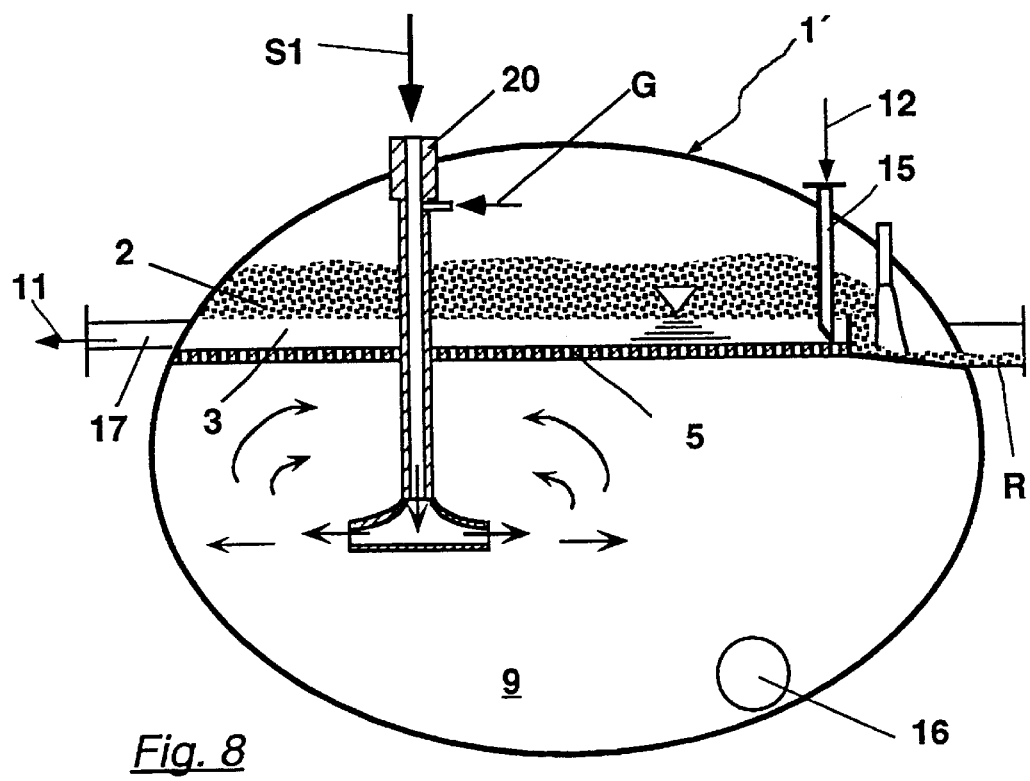
FIG. 8 is a schematic illustration of another device for performing the flotation process of the invention.

FIG. 8 shows a flotation device 1' which, in contrast to the flotation device in FIG. 1, is equipped with an oval flotation chamber 9. The fibrous material suspension S1 is introduced through an injector installation 20 into the flotation chamber. The gas supply G is introduced to the injector installation 20. A separating element 5 is provided as a sieve plate or a woven mesh, over which the intermediate layer 3 is formed, and over that, the flotation foam 2 is provided. The flotation foam 2 is diverted axially through a weir, mixed with water, and removed as a reject R from the floatation device 1'.

Figure 9:
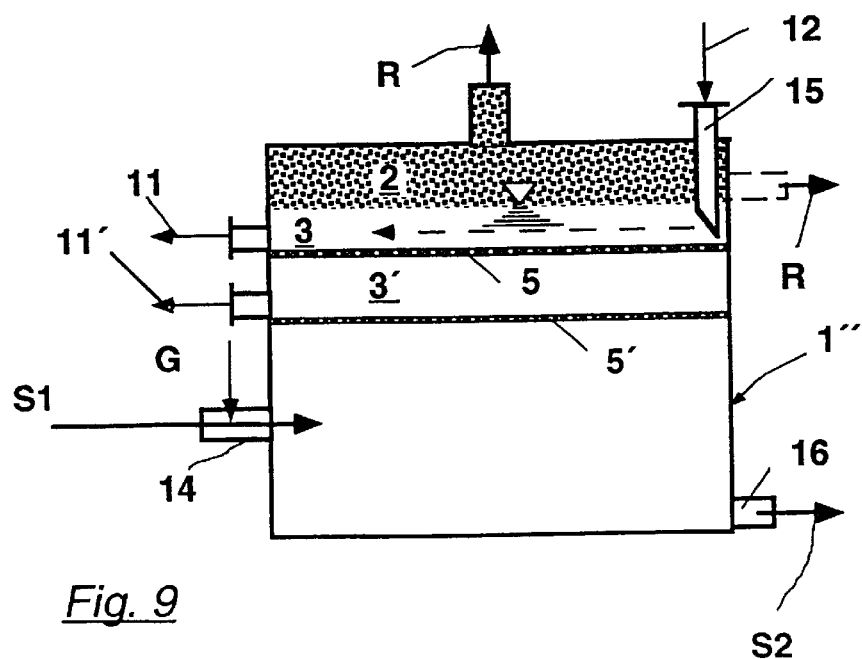
FIG. 9 is a schematic illustration of another device for performing the flotation process of the invention.

In FIG. 9 another aspect of the invention is shown in the form of a flotation device 1", which is provided with not only one but two separating elements 5 and 5' disposed above one another. Thereby, two intermediate layers 3 and 3' can form, which as a rule have a different composition with respect to the fiber content. In this aspect, through the lower separating element 5', the gas bubbles first enter the first intermediate layer 3', in which already a large portion of the bonded fibers can be washed off and diverted with the surplus 11'. Along their ascending path of the bubbles, the gas bubbles again reach an intermediate layer 3 through the separating element 5 but entrain far fewer fibers at this stage. Thus, an even better separation of the fibers can be attained in the intermediate layer 3. Of course, this sequence can be continued by connecting further separating elements and intermediate layers.

Even if the illustrations assume flotation processes exclusively, in which the gas bubbles ascend perpendicularly upward due to the gravitational field, the invention can easily be used with processes which use other force fields, e.g., centrifugal force. Separation plates of the present invention or similar plates would be particularly practical in a flotation cyclone, as shown in FIG. 6, since they maintain a peripheral movement in the intermediate layer and correspondingly, the centrifugal force also produced therein.

It is noted that the foregoing examples have been merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. Process for removing solid matter from an aqueous fibrous material suspension containing paper fibers, comprising:
   guiding the solid matter from the fibrous material suspension using gas bubbles;
   collecting the solid matter in a flotation foam;
   removing the solid matter as reject; and,
   forming a cleaned fibrous material suspension:
   wherein, the gas bubbles are guided through a perforated separating element from the fibrous material suspension and through an aqueous intermediate layer prior to the gas bubbles reaching the flotation foam, the aqueous intermediate layer having a fibrous material content which is at most approximately 50% by weight of the paper fiber content of the fibrous material suspension.

2. The process in accordance with claim 1, wherein the fibrous material content in the intermediate layer is at most approximately 20% by weight of that in the fibrous material suspension.

3. The process in accordance with claim 1, wherein the gas bubbles are substantially air bubbles.

4. The process in accordance with claim 2, wherein the intermediate layer extends in an ascending direction of the gas bubbles at a height of between approximately 50 mm and approximately 1000 mm.

5. The process in accordance with claim 1, further comprising:
   supplying the aqueous intermediate layer as a cleaning fluid predominately comprising water; and,
   maintaining the aqueous intermediate layer by diverting any surplus of the cleaning fluid.

6. The process in accordance with claim 5, wherein the cleaning fluid flows essentially transverse to an ascending direction of the gas bubbles.

7. The process in accordance with claim 1, wherein the aqueous intermediate layer is at least partially supplied by a mixture of gas bubbles and fluid which pass through the separating element.

8. The process in accordance with claim 1, wherein openings are provided in the separating element and have a width between approximately 2 mm and approximately 20 mm.

9. The process in accordance with claim 8, wherein the width of the openings is variable and adjustable, and the process further comprises:
   adjusting a width of the openings in the separating element.

10. The process in accordance with claim 5, wherein the cleaning fluid contains a chemical to facilitate separation of the fibers from the gas bubbles.

11. The process in accordance with claim 10, wherein the chemical contains a tenside/surface-active agent.

12. The process in accordance with claim 1, wherein flow of the mixture of gas bubbles and fluid is first passed through the separating element and then retarded.

13. The process in accordance with claim 1, wherein flow of the mixture of gas bubbles and fluid is diverted through the separating element from a substantially vertical direction of ascent of the gas bubbles.

14. The process in accordance with claim 1, wherein fluid transport through the separating element is approximately 5% maximum of throughput of the aqueous fibrous material suspension.

15. The process in accordance with claim 1, wherein the fibrous material suspension is turbulent and a portion of the turbulence in the fibrous material suspension is eliminated by passing through the separating element.

16. The process in accordance with claim 15, wherein a flow path of the mixture of gas bubbles and fluid through the separating element is at least approximately 10 mm long.

17. The process in accordance with claim 1, wherein at least one separating element is located above the aqueous intermediate layer, over which at least another intermediate layer is located, and wherein the flotation foam is collected in a region over an uppermost intermediate layer.

18. The process in accordance with claim 1, wherein the fibrous material suspension to be cleaned is guided in succession through at least two flotation devices, in which part of the solid matter is removed at each of the at least two flotation devices by gas bubbles, and wherein formation of at least one aqueous intermediate layer occurs due to at least one separating element in one part of the flotation process.

19. The process in accordance with claim 1, wherein at least a part of the separating element is displaceable.

20. The process in accordance with claim 1, wherein the perforated separating element includes a plurality of openings, and the process further comprises:
   guiding the gas bubbles through the plurality of openings in the separating element from the fibrous material suspension to the intermediate layer.

* * * * *